L. H. FLANDERS.
VENTILATION OF STORAGE BATTERIES.
APPLICATION FILED MAY 10, 1917.

1,302,648.

Patented May 6, 1919.
2 SHEETS—SHEET 1.

WITNESS:
Peter R. Kitchel.

INVENTOR
Louis H. Flanders,
BY
Augustus B. Stoughton
ATTORNEY.

L. H. FLANDERS.
VENTILATION OF STORAGE BATTERIES.
APPLICATION FILED MAY 10, 1917.
1,302,648.
Patented May 6, 1919.
2 SHEETS—SHEET 2.
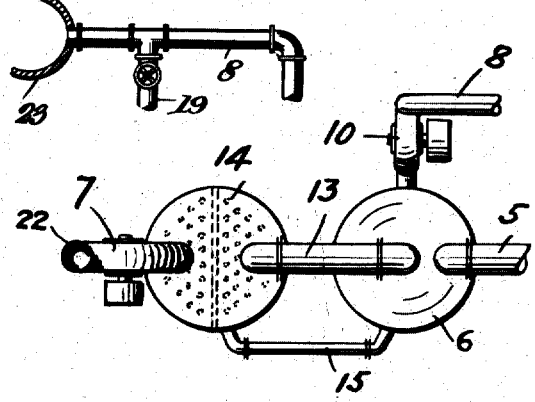
FIG. 7
FIG. 4.
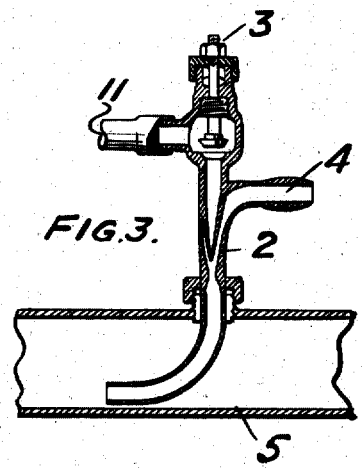
FIG. 3.
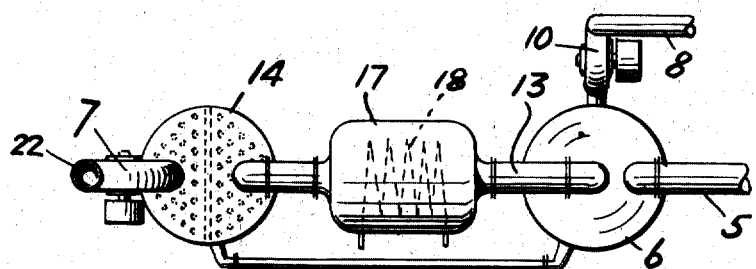
FIG. 5.
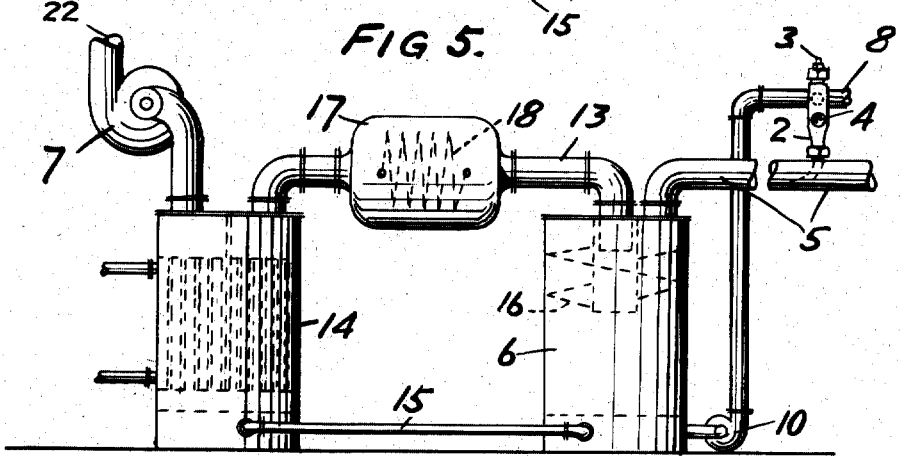
FIG. 6.
WITNESS:
INVENTOR
Louis H. Flanders
BY
ATTORNEY.

UNITED STATES PATENT OFFICE.

LOUIS H. FLANDERS, OF JENKINTOWN, PENNSYLVANIA.

VENTILATION OF STORAGE BATTERIES.

1,302,648.  Specification of Letters Patent.  Patented May 6, 1919.

Application filed May 10, 1917. Serial No. 167,653.

*To all whom it may concern:*

Be it known that I, LOUIS H. FLANDERS, a citizen of the United States, and a resident of Jenkintown, in the county of Montgomery and State of Pennsylvania, have invented certain new and useful Improvements in the Ventilation of Storage Batteries, of which the following is a specification.

Objects of the present invention are to provide efficient ventilation for storage batteries located in positions requiring ventilation, for example, on submarines; to provide for ventilating individual cells or groups of cells according to their individual needs, having regard for example to keeping them properly cooled; to recover, generally stated, not only acid but also entrained and absorbed water, customarily distilled water, carried away from the cells in the operation of ventilating them; and to burn gaseous products of the cells and recover the resultant water. Other objects of the invention will appear from the following description.

The invention will be claimed at the end hereof, but will be first described in connection with the embodiment of it chosen for illustration in the accompanying drawings, in which Figure 1, is a diagrammatic top or plan view of a ventilating system embodying features of the invention.

Fig. 3, is a sectional view, drawn to an enlarged scale, and illustrating an ejector.

Fig. 4, is a top or plan view illustrating a modification of the invention,

Figs. 5 and 6, are respectively a plan view and an elevational view of another modification of the invention, and Fig. 7 is a view illustrating the use of compressed air instead of water.

Figure 3A:
Fig. 3A, is a similar view illustrating a modified form of ejector.
Figure 2:
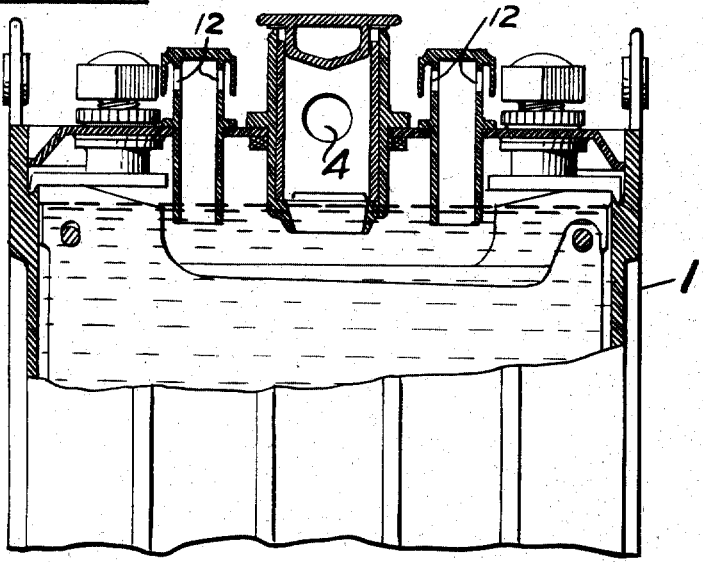
Fig. 2, is a sectional view of a well known type of submarine cell.

1 are the cells of a submarine battery and there is an exhauster, Fig. 3, for each cell or perhaps for a group of cells. The exhausters are independently regulatable so that the degree of ventiltion to which each of the cells or small groups of cells is subjected can be made appropriate for the individual requirements; for example, a cell or group of cells may be located at a place in the ship where there is considerable heat and therefore will require more ventilation in order to keep them properly cooled during charge and discharge than is required to keep other cells or groups of cells located in cooler positions properly ventilated. As shown the exhauster consists of an ejector 2, provided with a regulating valve 3 and with a connection 4 to a cell, or perhaps to a small group of cells. The exhausters discharge into an exhaust main 5 connected by way of the tank 6 with the suction side of an exhauster 7. There may be several branch exhaust mains. 8, is a manifold provided with a valve as 9 and connected with a pump 10 which draws water or fluid from the tank 6. To this manifold, or branches thereof, the various ejectors are connected by branches 11. It is well to provide an excess supply of fluid pressure in the manifold so that by adjusting the valves 3 each cell or small group of cells can be ventilated according to its needs. This adjustment having once been made, the valve 9 serves as a controlling valve for starting and stopping the ventilating operation. The connections 4 may be made to the cell as indicated in Fig. 2, in which air for cooling and ventilation enters the cell at 12 and bubbling through the electrolyte passes out at 4. By this arrangement the air serves to cool the cell as well as to dilute gases evolved therein so as to make them non-explosive. This system is well known but it requires the use of a considerable volume of air.

The present invention is applicable to another equally well known system in which the cells are cooled by externally applied air and in which there would be no opening such as 12 and in that case the connections 4 operate to create a partial vacuum and so remove the gases that are evolved in the cell. With either system the exhausters operate to isolate the cell, or small group of cells, to which they appertain from the rest of the cells thus localizing the effect of any explosion that might occur and so make it trivial and of no importance. Where air is drawn through the interior of the cells it entrains some acid and water and carries it away from the cells notwithstanding the fact that the latter are frequently provided with baffles intended to minimize this result. Furthermore the temperature of the batteries is often relatively high and so heats the air, in consequence of which the air absorbs water from the cells. The water in the cells is distilled water and is usually taken on board while in port so that it is desirable that distilled water be not wasted since in many cases the available supply of it is the limiting factor which determines the range of operation of the boat. Again where the air used for ventilation is discharged within the boat it is an advantage for the air not to contain acid.

Figure 1:
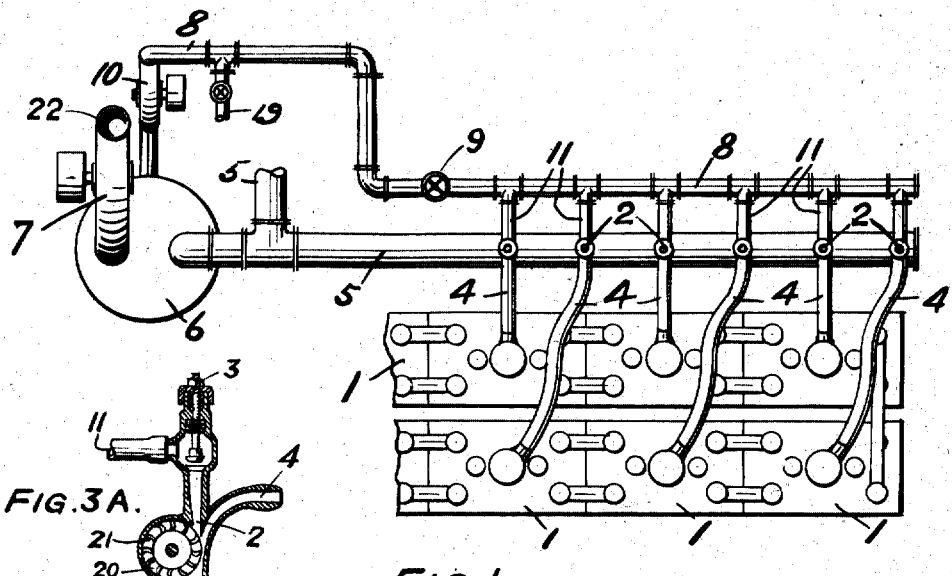

From the foregoing description it will be observed in connection with Fig. 1 that the ventilating system is a closed one in which the water employed may be distilled water and in that case the tank 6 may constitute the reservoir for distilled water, and the ventilating air escapes at the outlet 22 of the fan 7. The outlet 22 may be into the interior of the boat or overboard by means of suitable dampers, not shown, as is the present practice.

As shown in Fig. 4, the air outlet 13 is connected with a condenser 14 through which it is passed before reaching the blower 7. The condenser 14 and tank 6 are connected by a fluid pipe 15. In this case the condenser operates to condense the fluid absorbed in the air which fluid or distilled water is returned by the connection 15 to the tank 6. As shown in Figs. 5 and 6, the tank 6 is provided with a fluid extractor 16 and so performs the function of a liquid extractor and removes from the air entrained water and acid which collects in the bottom of the tank 6. Between the condenser 14 and the liquid extractor or tank 6 there is interposed a combustion chamber 17, constructed as of steel and properly lined, and in which there is arranged a screen 18 as of platinum wire which is kept incandescent as by means of appropriate electrical connections, not shown, and which serves to burn the battery gases, which are in association with a large supply of air, so disposing of them and whatever danger may be due to their presence, and forming steam or vapor which is condensed in the condenser 14 and returned to the tank 6. It may be remarked that the contents of the tank 6 consists of distilled water and some acid and is therefore appropriate for use in filling the battery cells. Compressed air from any suitable source 23 can be substituted for water for operating the ejectors and in that case the pump 10, may be dispensed with and the manifold 8, connected to the source of compressed air 23, as shown in Fig. 7. In Fig. 3ᴀ, the freely revolving wheel 20 provided with vanes 21, splits up the water jet so as to form water pistons, and the operation is like that of a LeBlanc condenser and air pump.

The function of the exhauster 7, is to discharge from the system gases withdrawn from the cells by exhausters such as are shown in Fig. 3, and Fig. 3ᴀ, after the same have been acted upon by the parts 6, 14 and 17, or some of them. The pipe 5, does not extend below the normal liquid level in the tank 6, or in other words the pipe 5, is not sealed in the tank 6. When the tank 6, is the source of supply of liquid for operating the ejectors or exhausters 2, it should contain sufficient supply to start them in operation. The ejectors 2, may help to condense moisture in the gases but their principal function is to withdraw gases from the cells and to seal off the individual cells or small groups of cells against explosion. By cell units is meant a cell or small group of cells consisting, for example, of three or four.

It will be obvious to those skilled in the art to which the invention relates that modifications may be made in details of construction and arrangement and in omitting parts or using all of the described apparatus without departing from the spirit of the invention, which is not limited as to those matters or otherwise than as the prior state of the art and the appended claims may require.

What I claim is:

1. Ventilation for storage batteries comprising the combination of a plurality of cells divided into cell units, and independent fluid actuated exhausters for the respective cell units.

2. Ventilation for storage batteries comprising the combination of a plurality of cells, and an independently adjustable ejector for each cell unit, substantially as described.

3. Ventilation for storage batteries comprising the combination of a plurality of cells, independently regulatable ejectors, and independent connections from said ejectors to individual cell units, substantially as described.

4. Ventilation for storage batteries comprising the combination of a plurality of cells, an exhaust main, a fluid supply manifold, a series of ejectors interposed between the main and manifold, and connections from said ejectors to individual cell units, substantially as described.

5. Ventilation for storage batteries comprising the combination of a plurality of cells, a valved fluid supply manifold, an exhaust main, a series of independently regulatable ejectors interposed between the main and manifold, and connections from said ejectors to individual cell units, substantially as described.

6. Ventilation for storage batteries comprising the combination of a plurality of cells, an exhaust main, a fluid supply manifold, a series of ejectors interposed between the main and manifold, connections from said ejectors to individual cell units, and means for circulating fluid through manifold and main, substantially as described.

7. Ventilation for storage batteries comprising the combination of a plurality of cells, an exhaust main, a fluid supply manifold, a series of ejectors interposed between the main and manifold, connections from said ejectors to individual cell units, and means including a storage tank for circulating fluid through the manifold and main, substantially as described.

8. Ventilation for storage batteries comprising the combination of a plurality of cells, a closed exhausting system for the cells, and a centrifugal fluid extractor included in the system and having provisions for recovering entrained fluid from gases, substantially as described.

9. Ventilation for storage batteries comprising the combination of a plurality of cells, an exhausting system for the cells, a combustion chamber and heated element for burning gaseous products, and a condenser for condensing the products of combustion.

10. Ventilation for storage batteries comprising the combination of a plurality of cells, a closed exhaust system for the cells, a fluid extractor included in the system and provided with means for recovering entrained battery fluid from gaseous products, a combustion chamber, and heated element at the outlet of the fluid extractor, and a condenser for liquefying the products of combustion, substantially as described.

11. Ventilation for storage batteries comprising the combination of a plurality of cells, an exhauster system for the cells which draws off air containing moisture, and means including a condenser at the outlet of the system for lowering the temperature of the air and precipitating such moisture and recovering the same.

12. Ventilation for storage batteries comprising the combination of a plurality of cells, an exhauster system for the cells, a fluid extractor included in the system and provided with means for recovering entrained fluid from gases, and a heated element and a condenser at the outlet of the system for recovering entrained and absorbed fluid and disposing of gases, substantially as described.

13. Ventilation for storage batteries comprising the combination of a plurality of cells, a group of ejectors for clearing the cells, and an exhauster common to the ejectors of the group.

LOUIS H. FLANDERS.

Copies of this patent may be obtained for five cents each, by addressing the "Commissioner of Patents, Washington, D. C."